(12) United States Patent
Hu et al.

(10) Patent No.: US 11,397,424 B2
(45) Date of Patent: Jul. 26, 2022

(54) COMMISSIONING OF INDUSTRIAL PROCESSES EQUIPPED WITH WIRELESS SENSORS

(71) Applicant: ABB Schweiz AG, Baden (CH)

(72) Inventors: Zhongliang Hu, Helsinki (FI); Toni Kuikka, Helsinki (FI); Mikko Kohvakka, Helsinki (FI)

(73) Assignee: ABB Schweiz AG, Baden (CH)

( * ) Notice: Subject to any disclaimer, the term of this patent is extended or adjusted under 35 U.S.C. 154(b) by 83 days.

(21) Appl. No.: 16/885,985

(22) Filed: May 28, 2020

(65) Prior Publication Data
US 2020/0379449 A1 Dec. 3, 2020

(30) Foreign Application Priority Data

May 28, 2019 (EP) .................................. 19176986

(51) Int. Cl.
G05B 19/418 (2006.01)
(52) U.S. Cl.
CPC .............. *G05B 19/41835* (2013.01); *G05B 2219/31449* (2013.01)
(58) Field of Classification Search
CPC ... G05B 19/41835; G05B 2219/31449; H04W 84/18
USPC ........................................................ 700/28
See application file for complete search history.

(56) References Cited

U.S. PATENT DOCUMENTS

| 2009/0105850 | A1* | 4/2009 | Miyata | H04L 12/40169 700/28 |
| 2017/0060145 | A1* | 3/2017 | Morris | H02P 23/0004 |
| 2017/0364044 | A1 | 12/2017 | Meruva et al. | |
| 2018/0359108 | A1 | 12/2018 | Roquemore, III et al. | |

OTHER PUBLICATIONS

European Patent Office, Extended Search Report issued in corresponding Application No. 19176986.8, dated Nov. 27, 2019, 11 pp.

* cited by examiner

*Primary Examiner* — Jigneshkumar C Patel
(74) *Attorney, Agent, or Firm* — Leydig, Voit & Mayer, Ltd.

(57) ABSTRACT

According to an aspect, there is provided method for commissioning a drive. First, a local network is established between a wireless computing device, one or more wireless sensor devices and a drive. Each wireless sensor device is configured to measure one or more physical quantities associated with an industrial system controlled by the drive. The wireless computing device configures wirelessly the drive and the one or more wireless sensor devices for performing measurements. In response to receiving one or more measured values from the one or more wireless sensor devices, the wireless computing device displays the information on the one or more measured values on a display for providing guidance for a user of the wireless computing device for adjusting drive parameters of the drive.

15 Claims, 5 Drawing Sheets

Fig. 6

COMMISSIONING OF INDUSTRIAL PROCESSES EQUIPPED WITH WIRELESS SENSORS

TECHNICAL FIELD

Various example embodiments relates to control of industrial processes.

BACKGROUND

Drives are commonly used to control a variety of industrial processes, typically to achieve optimal performance and efficiency from the given process. Drives may be employed, for example, to control lifts, cranes, pumps, fans and conveyor belts. To ensure high user experience and quality of production, it is important to perform commissioning effectively and expediently so as to achieve desired operation for the controlled machine or machines (e.g., in terms of speed, torque, acceleration, ramp settings and so on), preferably in a reasonable amount of time. Commissioning of a drive requires a lot of expertise and testing as the optimal drive parameters of the drive depend on the controlled machine or machines, other elements of the industrial process as well as on certain properties of the used drive, for example, motor type and surrounding environment, for example, temperature and humidity. Typically, the commissioning requires extensive testing during the performing of which the drive parameters are adjusted through trial and error little by little so as to eventually hone on the optimal drive parameters for the drive.

Therefore, there is a need for a better way for commissioning drives so as to overcome or alleviate at least some of the aforementioned problems.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide a method, an apparatus, a system and computer readable media for commissioning and/or calibrating of industrial processes.

BRIEF DESCRIPTION OF DRAWINGS

In the following, example embodiments will be described in greater detail with reference to the attached drawings, in which FIG. 1 illustrate an exemplary industrial system according to embodiments.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. The (wireless) communications network to be discussed below may, in some embodiments, be any wireless communications network listed in this paragraph.

Figure 1:
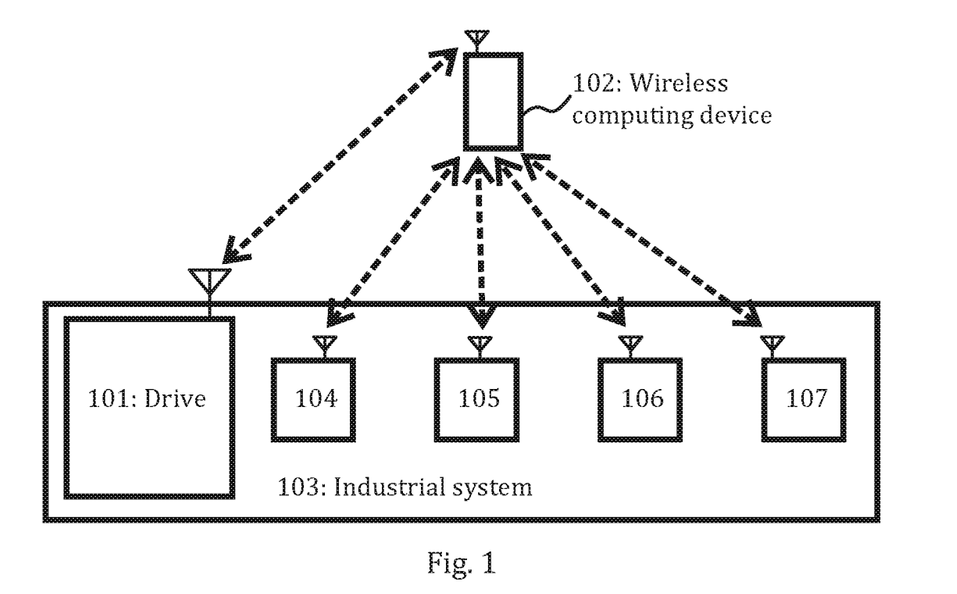

A general architecture of a system to which embodiments of the invention may be applied is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates a system comprising a wireless computing device 102 and an industrial system 103 (e.g., a production or assembly line system or a part thereof) controlled by the drive 101. One or more wireless sensor devices 104, 105, 106, 107 (preferably, a plurality of wireless sensor devices) may be installed to various parts of the industrial system 103. Each wireless sensor device 104, 105, 106, 107 is able to communicate wirelessly at least with the wireless computing device 102. In some embodiments, the industrial system 103 may comprise at least the drive 101, at least one electrical machine controlled by the drive and at least one mechanical system powered by the electrical machine. Said at least one mechanical system may be equipped with said one or more wireless sensor devices 104, 105, 106, 107.

The drive 101 may be any device which may be used to control the motion of machines (for example, the motion of an electrical motor of an electrical machine) by changing one or more drive parameters and which may be connected to the wireless sensor device 102 wirelessly. The drive parameters of the drive 101 may comprise parameters such as torque (or torque reference), speed (or speed reference), power, voltage, frequency, motor control mode (e.g., scalar, vector or direct torque control), proportional-integral-derivative (PID) controller settings, acceleration ramp settings, deceleration ramp settings, motor nameplate values and/or other parameters affecting the operation of the drive.

Regarding the torque and/or speed reference provided in the drive parameters, the drive may be configured so that the drive (or specifically the control loop of the drive) attempts to meet the speed or torque reference as well as possible (i.e., to make the actual speed match the speed reference and/or the actual torque match the torque reference). In the following, it is assumed that the drive 101 is an electrical drive (a DC drive or an AC drive supporting low to high voltages), though the embodiments of the invention may also be applied to hydraulic drives and/or mechanical drives. The drive 101 may be a frequency converter, a programmable logic controller (PLC) or a (motor) soft starter. In an embodiment, the drive 101 may be a variable speed drive (VSD) or a variable frequency drive (VFD). The drive 101 may have an internal clock for sequencing its operation according to instructions (drive control sequence) received from the wireless computing device 102.

The drive 101 may be connected using a (wired) connection to an electrical machine driving industrial (or possibly in some embodiments non-industrial) processes (i.e., driving a machine, a device, a component, an apparatus or a system for performing an industrial or non-industrial process). The electrical machine may comprise one or more AC and/or DC electrical motors which may run, for example, a system for transporting material, such as a pump, a fan, a compressor, a blower, a conveyor belt, a crane and/or an elevator and/or a system for processing materials, such as a paper machine, a mill, a stirrer and/or a centrifuge.

The wireless computing device 102 refers to a computing device (equipment, apparatus) configured to communicate wirelessly with the drive 101 and the one or more wireless sensor devices 104, 105, 106, 107. Specifically, the drive 101 and the one or more wireless sensor devices 104, 105, 106, 107 may be controllable by the wireless computing device 102. In other words, the wireless computing device 102 may have a master-slave relationship with each of the drive 101 and/or the one or more wireless sensor devices 104, 105, 106, 107 (with the wireless computing device 102 acting as the master). The wireless sensor device 102 may be a portable device. The wireless connection between the wireless computing device 102 and each of the drive 101 and the one or more wireless sensor devices 104, 105, 106, 107 may be provided using any standard wireless protocol, such as Bluetooth Low Energy, Bluetooth or Wi-Fi. In some embodiments, the wireless computing device 102 may specifically be an Internet of Things (IoT) edge gateway (for the one or more wireless sensor devices 104, 105, 106, 107). In some preferred embodiments, the wireless computing device 102 may be a mobile phone (e.g., a smart phone), a tablet computer, a desktop computer or a laptop computer. In general, computing devices (apparatuses) which may be employed as the wireless computing device 102 include wireless mobile communication devices operating with or without a subscriber identification module (SIM) in hardware or in software, including, but not limited to, the following types of devices: touch screen computer, mobile phone, smart-phone, personal digital assistant (PDA), handset, e-reading device, tablet, game console, multimedia device, wearable computer, smart watch, telemetry appliances, and telemonitoring appliances. The wireless computing device 102 may comprise at least one memory.

Each of said one or more wireless sensor devices 104, 105, 106, 107 installed to the industrial system 103 may be a computing device configured to measure one or more physical quantities each of which quantifies an aspect of the industrial system 103 which is controlled by the drive 101. Each of said one or more wireless sensor devices 104, 105, 106, 107 may comprise one or more sensors (i.e., sensing elements). In some embodiments, said one or more wireless sensor devices 104, 105, 106, 107 may be dedicated wireless sensor devices (i.e., computing device predominantly for performing measurements and communicating results of said measurements to other, more powerful computing devices) with limited memory and/or processing power, for example, compared to the wireless computing device 102 and/or the drive 101. Specifically, said one or more wireless sensor devices 104, 105, 106, 107 may be dedicated low-power wireless (micro)sensor devices such as Bluetooth Low Energy sensor devices. Each wireless sensor device 104, 105, 106, 107 may comprise at least a radio transceiver comprising or connected to at least one antenna, a microcontroller comprising at least one memory, an electronic circuit for interfacing with the one or more sensors and an energy source (e.g., a battery). Each wireless sensor device 104, 105, 106, 107 may have an internal clock for sequencing their operation according to instructions (sensor measurement sequence) received from the wireless computing device 102.

Said one or more sensors for each wireless sensor device 104, 105, 106, 107 may comprise one or more kinematic sensors such as a speed sensor (i.e., a speedometer), an acceleration sensor (i.e., an accelerometer), a vibration sensor, a position sensor, an angular position sensor, a displacement sensor, an angular velocity sensor (i.e., a gyro sensor), an angular acceleration sensor and a torque sensor. Said one or more kinematic sensors may be installed directly onto a moving element of the industrial system. The one or more sensors 108 may, also or alternatively, comprise one or more sensors not (directly) related to measuring physical movement such as an acoustic sensor, a humidity sensor, a temperature sensor, a light sensor, an air flow sensor and/or a chemical sensor. The acoustic sensor measures acoustic frequency spectrum which may be used for analyzing condition of one or more components of the industrial system 103. The chemical sensor may be, for example, a pH sensors (e.g., for wastewater monitoring). Some of the one or more sensors (e.g., a humidity or temperature sensor) may be used to analyze the operating conditions of the industrial system which may affect the behavior of the industrial system while others may be used to analyze how continuous running of the process affects certain properties of the process. For example, a wireless temperature sensor may measure temperature rise during the operation of the system. In some embodiments, the one or more sensors may comprise two or more sensors of the same type.

In some embodiments, the one or more wireless sensor devices 104, 105, 106, 107 may specifically be dedicated (low energy) wireless sensor devices and/or dedicated (low energy) wireless microsensor devices. In such embodiments, the one or more wireless sensor devices 104, 105, 106, 107 may each (or at least some of them) comprise only a single sensor or microsensor for measuring a single physical quantity (e.g., speed, acceleration, temperature or torque).

In some embodiments, said one or more wireless sensor devices 104, 105, 106, 107 installed to the industrial system 103 are (dedicated) Bluetooth Low Energy sensor devices. Bluetooth Low Energy is a low-power, short-range, low-data-rate wireless communication protocol defined by the Bluetooth Special Interest Group. Bluetooth Low Energy is designed to efficiently transfer a small amount of data with low power consumption. Consequently, Bluetooth Low Energy sensor devices may be very small and light. Bluetooth Low Energy sensor devices are battery-powered with a considerably long battery life. Similar to as described above, said one or more Bluetooth Low Energy sensor devices 104, 105, 106, 107 may have a slave-master relationship with the more powerful wireless computing device 102. In other words, the one or more wireless sensor devices 104, 105, 106, 107 may be devices acting as servers (i.e., devices that receive commands and requests and return responses) for Bluetooth Low Energy communication (with the wireless computing device acting 102 as a client initiating commands and requests and accepting responses).

As opposed to the wireless computing device which may be a smart phone or a tablet computer supporting multiple air interfaces (e.g., cellular, Bluetooth, Bluetooth Low Energy and WiFi), said one or more wireless sensor devices 104, 105, 106, 107 may only support a single (radio-transmission) air interface. Said single (radio-transmission) air interface may specifically be the Bluetooth Low Energy air interface or other low-power radio-transmission air interface.

To give a few practical non-limiting examples of the wireless sensor devices 104, 105, 106, 107, the one or more wireless sensor devices 104, 105, 106, 107 may comprise a wireless accelerometer attached to a blade of a cooling fan, an air flow sensor measuring air flow through a cooling fan, a wireless temperature sensor measuring a temperature of an intermediate product (e.g., a liquid) of a manufacturing process and/or a wireless speedometer attached to a lift measuring its speed.

While FIG. 1 illustrates only connections between each of the one or more wireless sensor devices 104, 105, 106, 107 and the computing device 102, in some embodiments the one or more wireless sensor devices 104, 105, 106, 107 may be able to establish wireless communication links also between each other. Further, in some embodiments, all of the one or more wireless sensor devices may not able to connect (directly) to the wireless computing device 102. To ensure that communication between the wireless computing device 102 and each of the one or more wireless sensor device 104, 105, 106, 107 is enabled, the one or more wireless sensor devices 104, 105, 106, 107 may be able to form a wireless sensor network (WSN). The wireless sensor network may have, for example, a star topology, a mesh topology, a tree topology or a fully connected topology. At least one of the one or more wireless sensor devices 104, 105, 106, 107 may be defined as a gateway sensor node providing access to the wireless computing device 102. Any wireless sensor devices 104, 105, 106, 107 not defined as gateway sensor nodes of the wireless sensor network may access the wireless computing device 102 via one of said at least one gateway sensor node and possibly one or more other wireless sensor devices. In other words, multi-hop routing may be employed in these cases. Obviously, the routing as described above applies in a similar manner in both directions (i.e., for transmission from and to the wireless computing device 102).

The one or more wireless sensor devices 104, 105, 106, 107 may be adapted to allow rigidly but detachably fixing the one or more wireless sensor devices 104, 105, 106, 107 to their respective measurement positions.

Figure 2:
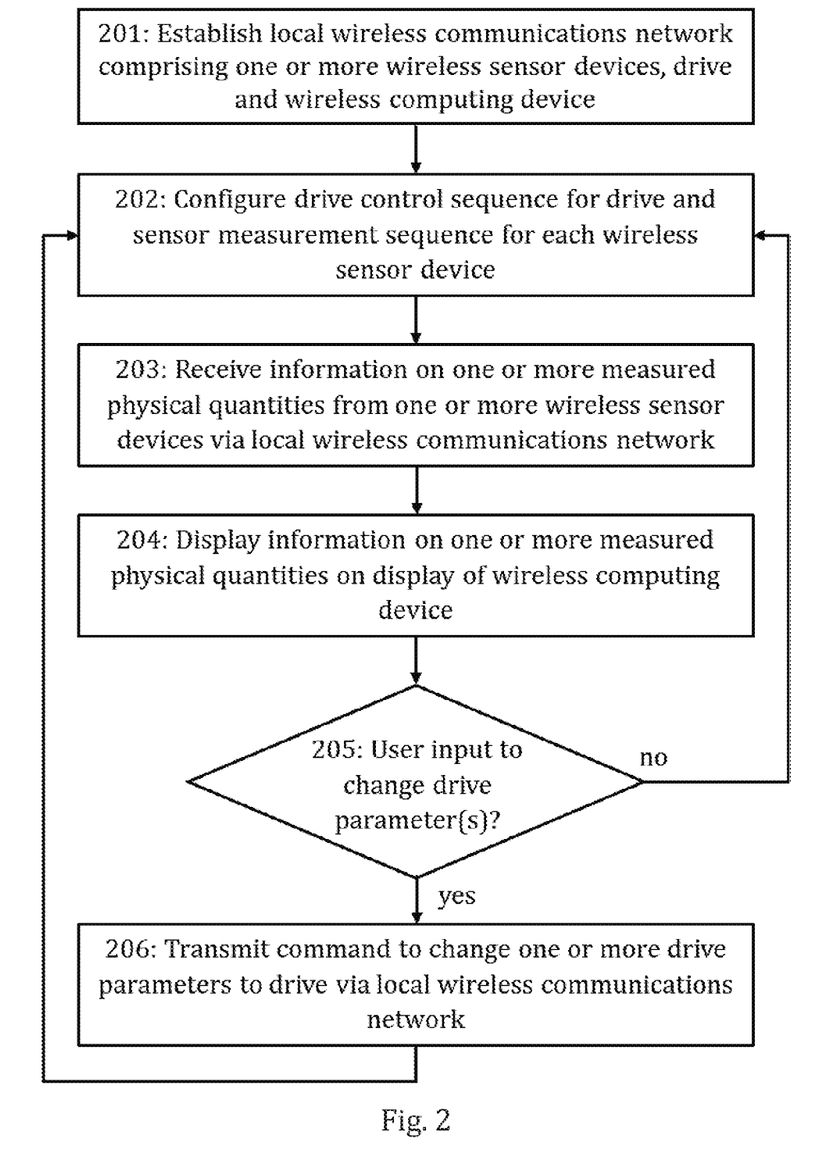
FIGS. 2 and 3 illustrate exemplary processes according to embodiments.

FIG. 2 is a flow diagram according to an embodiment of the invention, illustrating a process for tuning the operation of an industrial system based on measurements by one or more wireless sensor devices installed to the industrial system. Specifically, the process of FIG. 2 may correspond to commissioning or calibrating an industrial system comprising a drive using one or more wireless sensor devices installed to different parts of the industrial system. The process may be performed by a wireless computing device (e.g., the wireless computing device 102 of FIG. 1) which may be, for example, a smart phone or a tablet computer.

Referring to FIG. 2, the wireless computing device establishes (or initializes), in block 201, a local wireless communications network comprising one or more wireless sensor devices, a drive and the wireless computing device. The local wireless communications network may be defined as a wireless communications network employing short-range wireless technology (e.g., Bluetooth Low Energy, Bluetooth or WiFi). The local wireless communications network may be equally called a wireless local area network (corresponding to the broad definition of the term not limited strictly to WiFi). The establishing may be achieved by communicating wirelessly with each of the one or more wireless sensor devices and the drive. The one or more wireless sensor devices are arranged and configured to measure one or more physical quantities each of which quantifies an aspect of an industrial system which is controlled by the drive. Specifically, each wireless sensor device may measure at least one physical quantity. If the one or more wireless sensor devices comprises multiple wireless sensor devices, they may form a wireless sensor network (as described in relation to FIG. 1).

The wireless computing device configures, in block 202, a drive control sequence for the drive by communicating with the drive over the local wireless communications network and a sensor measurement sequence synchronized (at least in part) with the drive control sequence for each of said one or more wireless sensor devices by communicating with each of said one or more wireless sensor devices over the local wireless communications network. In simple terms, the drive control sequence and each sensor measurement sequence defines, respectively, how and when the drive and each wireless sensor device should operate (i.e., drive the industrial system or perform measurements). The sensor measurement sequence may be defined separately for each wireless sensor device. The configuring for the drive may comprise transmitting the drive control sequence to the drive and subsequently receiving an acknowledgment from the drive. The configuring for each wireless sensor device may comprise transmitting the sensor measurement sequence to said wireless sensor device and subsequently receiving an acknowledgment from said wireless sensor device.

The drive control sequence for the drive may define at least a starting time for operation of the drive (e.g., at 11:00 local time) and an ending time for the operation of the drive (e.g., at 11:10 local time). Moreover, the drive control sequence may comprise information on one or more drive parameters of the drive to be employed during the running of the drive. Said one or more drive parameters may be any drive parameters as described in relation to FIG. 1. Similarly, each sensor measurement sequence may define at least a starting time for performing measurements by a wireless sensor device and an ending time for performing measurements by the (same) wireless sensor device. Moreover, each sensor measurement sequence may comprise information on one or more measurement parameters such as a sampling rate (e.g., 10 Hz) or a time resolution (e.g., 100 ms) for measurements by the wireless sensor device. If a particular wireless sensor device comprises multiple sensors, the sensor measurement sequence may define which of said sensors are to be used for measurements and define the starting and/or ending time and/or one or more measurement parameters separately for each of said sensor(s) to be used for measuring. In some embodiments, the starting time for the drive and for each wireless sensor device may be the same so as to synchronize the operation of the industrial system (using the drive) with the measurements. Similarly, the corresponding ending times may be the same. In other embodiments, the starting time for the drive may be earlier than the starting time for the one or more wireless sensor devices. In some embodiments, a duration of operation (in the drive control sequence) or a duration of measurements (i.e., in each sensor measurement sequence) may be defined instead of the ending time.

In some embodiments, each sensor measurement sequence may further comprise information on pre-defined time (or time slot) when that particular wireless sensor device should transmit its measurement results to the wireless computing device. This information may also be included in the drive control sequence.

The wireless computing device receives, in block 203, information on one or more measured values of the one or more physical quantities from the one or more wireless sensor devices via the local wireless communications network. Each of the one or more physical quantities quantifies the operation of the industrial system in a different way. Information on one or more measured values of one or more physical quantities received from each wireless sensor devices may comprise, for example, one or more measured values for speed, acceleration, vibration metric, positional metric (e.g., a vector defining x-, y- and z-coordinate positions), angular positional metric, a displacement metric, angular velocity, angular acceleration, torque, humidity, temperature, sound (power) level, light intensity and/or pH. Preferably, the wireless computing device receives, in block 203, from each of the one or more wireless sensor devices, information on a plurality of values of at least one physical quantity measured successively according to a corresponding configured sensor measurement sequence.

The wireless computing device displays, in block 204, the information on one or more measured physical quantities on a display (or a screen) of the wireless computing device for providing guidance for a user of the wireless computing device for adjusting drive parameters of the drive. The current drive parameter(s) used by the drive may have been transmitted to the wireless computing device earlier (e.g., in block 201 or 202) wirelessly and may be maintained in a memory of the wireless computing device. The information on the one or more measured physical quantities may be displayed as raw measurement data (e.g., in numeric form) or preferably in a more visual format such as a graph or plot of the physical quantity in question against time or number of samples. In some embodiments, said graph may also include a reference curve corresponding to desired (optimal) performance for said physical quantity (if such data is available) for facilitating the evaluation of the measurement results by the user. This reference curve may be pre-defined and may be maintained in a memory of the wireless computing device.

In response to receiving a user input from a user of the wireless computing device for changing one or more drive parameters of the drive via a user interface (e.g., a touch screen or a keyboard) in block 205, the wireless computing device transmits, in block 206, a command to change said one or more drive parameters to the drive via the local wireless communications network. Only some or all of the drive parameters defined for the drive may be changed by the user in blocks 205, 206. In some embodiments, the wireless computing device may receive subsequently an acknowledgment acknowledging that the drive parameters of the drive have been changed as instructed from the drive via the local wireless communications network.

After said one or more drive parameters of the drive have been changed (in an effort to improve the operation of the industrial system), blocks 202 to 206 may be repeated to determine whether this adjustment of the drive parameters improved the operation of the industrial system as intended and whether further adjustments are still required. When commissioning a new drive, several rounds of adjustments to the drive parameters may typically be needed to achieve the optimal operation. Despite of this, the time-saving compared to conventional manual setting of the drive parameters of a new drive is considerable in most cases.

In some embodiments, blocks 205, 206 may be omitted. In such embodiments, the process may terminate in block 204 or loop from block 204 back to block 202. In these embodiments, the user may, for example, change the drive parameters based on the displayed information directly by employing a user interface (e.g., a control panel) of the drive.

Once the commissioning of the drive is completed (i.e., tuning of the drive parameters of the drive has finished), the one or more wireless sensor devices may be removed from the industrial system and the normal operation of the industrial system may commence. If the process environment is known to be relatively unstable, the one or more wireless sensor devices may be kept in place to enable repeating the measurements and performing further fine-tuning of the drive parameters with ease (e.g., during maintenance breaks).

Figure 3:
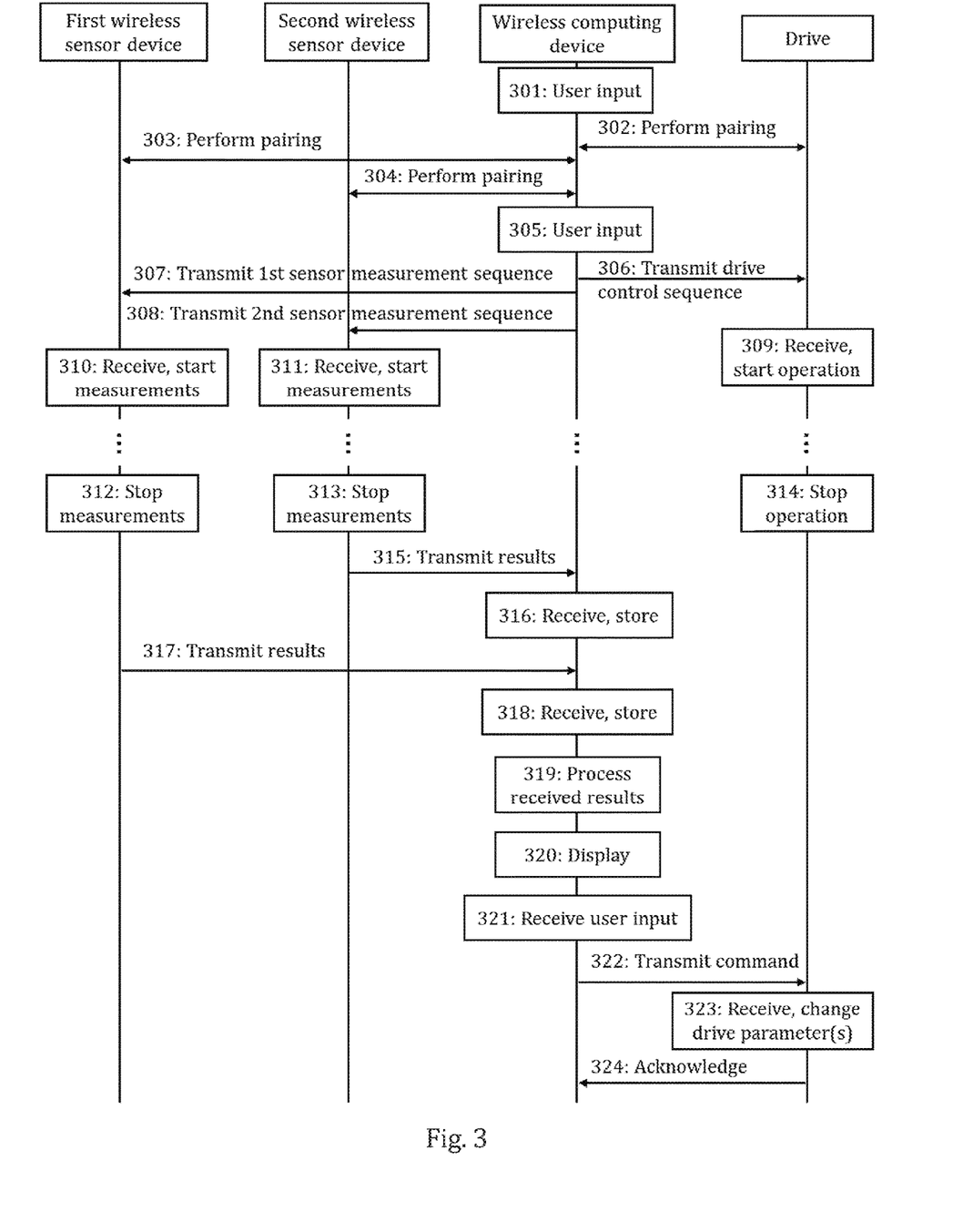

FIG. 3 shows a signalling diagram according to an embodiment. The illustrated process corresponds for the most part to the embodiment illustrated in FIG. 2. Any definitions given in relation to FIG. 2 may apply as such also for this embodiment. The illustrated process may be carried out in the system illustrated in FIG. 1. However, in this particular example, only two wireless sensor devices are used for performing measurements for simplicity of discussion. In other embodiments, another number of wireless sensor devices (i.e., one or larger than two) may be employed in a manner similar to as discussed below for two wireless sensor devices.

Referring to FIG. 3, in response to receiving a user input in block 301 (via a user interface of the wireless computing device), the wireless computing device performs pairing with the drive in messages 302 and with a first wireless sensor device in messages 303 and a second wireless sensor device in messages 304. The user input may correspond to simply initiating the pairing procedure of messages 302, 303, 304. In some cases, said user input may define also the drive and the wireless sensor device(s) to be used for pairing. The pairing in messages 302, 303, 304 may correspond, for example, to Bluetooth or Bluetooth Low-Energy pairing procedure. In some embodiments, the pairing may be automatic, that is, block 301 may be omitted.

After a (local) wireless communications network has been established through the pairing procedure in messages 302 to 304, the wireless computing device receives, in block 305, further user input. Specifically, said further user input may define a drive control sequence for the drive, a first sensor measurement sequence for the first wireless sensor device and a second sensor measurement sequence for the second wireless sensor device. In other words, the user of the wireless computing device uses the user interface of the wireless computing device to set at least starting and ending times for the operation of the drive and the measurements and optionally also one or more drive parameters to be used by the drive and one or more measurement parameters (e.g., sampling rate) to be used by the first and second wireless sensor devices. Based on this further user input, the wireless computing device transmits, in messages 306, 307, 308, the drive control sequence to the drive, the first sensor measurement sequence to the first wireless sensor device and the second sensor measurement sequence to the second wireless sensor device using the local wireless communications network established through the pairing. In some embodiments, the configuration (i.e., the drive control sequence and/or the sensor measurement sequences) may be predefined in the wireless computing device and performed automatically, that is, block 305 may be omitted.

In response to receiving the drive control sequence from the wireless computing device in block 309, the drive starts, in block 309, its operation according to the drive control sequence. In response to receiving the first and second sensor measurement sequences from the wireless computing device in blocks 310, 311, the first and second wireless sensor devices start performing measurements, in blocks 310, 311, according to the first and second sensor measurement sequences, respectively. Correspondingly after a pre-defined ending time has been reached or a pre-defined time after starting the operation has passed, the drive stops, in block 314, its operation according to the drive control sequence. After a pre-defined ending time has been reached or a pre-defined time after starting the measurements has passed, the first and second wireless sensor devices stop the performing of the measurements, in blocks 312, 313, according to the first and second sensor measurement sequences, respectively. Blocks 309 to 311 (or at least blocks 310, 311) may be configured to be carried out simultaneously with each other. Similarly, blocks 312 to 314 (or at least blocks 312, 313) may be configured to be carried out simultaneously with each other. In some embodiments, the drive may be started before the wireless sensor devices start their measurements and/or the drive may stop its operation after the wireless sensor devices have finished their measurements. Each of the first and second wireless sensor devices may measure one or more physical quantities (e.g., temperature, acceleration, electric current and/or air flow). Each of the first and second wireless sensor device perform one or more measurements of the one or more corresponding physical quantities according to the sensor measurement sequence between blocks 310, 312 or blocks 311, 313, respectively. Preferably, a plurality of successive measurements are performed by each of the first and second wireless sensor devices.

After the second wireless sensor device has stopped performing measurements in block 313, it transmits, in message 315, results of the measurements (i.e., information on one or more measured physical quantities) to the wireless computing device via the local wireless communications network. In response to receiving the results of the measurements from the second wireless sensor device in block 316, the wireless computing device stores, in block 316, them to a memory of the wireless computing device. Similarly, after the first wireless sensor device has stopped performing measurements in block 312, it transmits, in message 317, results of the measurements to the wireless computing device via the local wireless communications network which in response to receiving the results of the measurements from the first wireless sensor device, stores, in block 318, them to the memory of the wireless computing device.

Once the wireless computing device has received all the measurement results from all the wireless sensor device (i.e., in this case from the first and second wireless sensor device), it processes, in block 319, the received results. The processing may comprise, for example, extracting from the received measurement results (or measurement data) the relevant data (i.e., at least measured values of a physical quantity) to be presented to the user and/or combining results from different wireless sensor devices. The processing may, also or alternatively, comprise scaling of the measured values, e.g., to use a metric scale, illustrating the measured values against time as a graph, performing frequency spectrum analysis (e.g., fast Fourier transform) and/or calculating of a maximum, minimum and/or average value of measured values of a particular physical quantity. In some embodiments, the wireless computing device may perform one or more signal processing processes (e.g., filtering) for the received measurement data. After the received measurement results have been processed, the wireless computing device displays, in block 320, the measurements results on a display of the wireless computing device. For example, the wireless computing device may display one or more graphs or plots illustrating the measured values for the physical quantities as a function of, e.g., time or number of samples in a clear, easily digestible manner.

Based on the displayed information, the user of the wireless computing device is able to determine how the drive parameters of the drive should be adjusted to improve performance of the industrial system. In response to receiving a user input for changing one or more drive parameters of the drive in block 321, the wireless computing device transmits, in message 322, a command to change said one or more drive parameters to the drive via the local wireless communications network. In response to receiving said command in block 323, the drive changes, in block 323, its drive parameters according to the command and subsequently transmits, in message 324, an acknowledgment back to the wireless computing device. Thereafter, the process of blocks 305 to 324 may be repeated to see whether improve performance for the industrial system is achieved.

It should be noted that the embodiments discussed above provide considerable advantages compared to traditional sensor systems. Traditional sensor systems typically employ hardwired sensors connected with fieldbus networks and contain dedicated I/O stations. This makes them much more difficult to install compared to a set of wireless sensor devices, especially if said wireless sensor devices are dedicated low-energy wireless sensor devices being typically of small size and light weight making them ideal for temporary installations. Such traditional sensor systems are not suitable for temporary installations, as opposed the solutions according to embodiments. The wiring of the wired sensors may also have a negative effect on the measurement results.

In the following, the operation of the invention according to embodiments is described using an exemplary user story.

Sami is a support engineer working at a company involved in industrial automation. Today, he needs to travel to a chocolate factory in Helsinki to commission a rather complex manufacturing line which includes a lot of motors and drives. It is usually very tricky to tune the whole process since this usually requires modelling the complicated process in its entirety. Due to limited time available for the tuning, the end result of the tuning may still end up being a non-optimal process producing less than perfect chocolate. Luckily, Sami recently installed a new intelligent commissioning application for his mobile phone and he is eager to try it out.

First, Sami deploys a few wireless sensor devices (sensor nodes) on a few key locations in the manufacturing line. For example, he sticks a magnetic wireless acceleration sensor to a (metallic) blade of the cooling fan and installs a wireless temperature sensor so as to measure temperature of the chocolate in a temperature-critical phase of the manufacturing process. The wireless sensor devices used by Sami are very small devices with very little processing power and memory (i.e., low-energy or low-power devices such as Bluetooth Low-Energy devices).

Then, Sami takes out his mobile phone, connects the mobile phone wirelessly to all the wireless sensor devices that he deployed, configures them, e.g., so that all the sensors will start to record data at exactly 13:30 (which is in about 5 minutes), with 10 ms resolution and 60 second recording time. After this, he presses the start in the application which consequently schedules the drive to start at 13:30 (which is in about 2 minutes at this point). Now, Sami just has to wait for the drive to start operating and the electric motor which the drive is controlling to start rolling causing the movement of the manufacturing line and associated devices. After about 60 seconds (the measurement time defined in the sensor measurement sequences), the sensor nodes are taking turns to send and sync their recorded data to Sami's mobile phone. An accurate plot of the measurement data is rendered on the display of the mobile phone.

After a few rounds of tuning the drive parameters and recapture the data using the wireless sensor devices, Sami is able to commission the optimized factory production line within hours, as opposed to several days it might have taken without the intelligent commissioning application. Sami will, then, decommission the wireless sensor devices (that is, remove the wireless sensor device from the manufacturing line) and take them with him.

The blocks, related functions, and information exchanges described above by means of FIGS. 2 and 3 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 4:
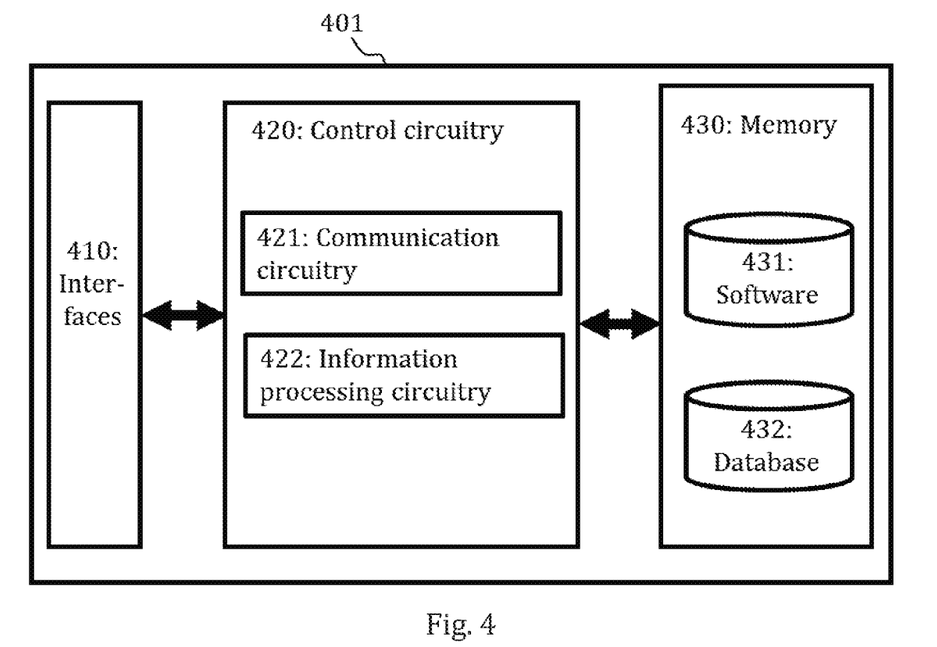
FIG. 4 illustrates an apparatus according to embodiments.

FIG. 4 provides a wireless computing device 401 according to some embodiments. Specifically, FIG. 4 may illustrate a wireless computing device configured to carry out at least the functions described above in connection with configuring the one or more wireless sensor device and the drive and collecting and displaying the measurement results. The wireless computing device 401 may be a wireless computing device 102 of FIG. 1. The wireless computing device 401 may comprise one or more control circuitry 420, such as at least one processor, and at least one memory 430, including one or more algorithms 431, such as a computer program code (software) wherein the at least one memory and the computer program code (software) are configured, with the at least one processor, to cause the wireless computing device to carry out any one of the exemplified functionalities of the wireless computing device described above. Said at least one memory 430 may also comprise at least one database 432.

Referring to FIG. 4, the one or more control circuitry 420 of the wireless computing device 401 comprise at least communication circuitry 421 for establishing a local wireless communications network with a drive and one or more wireless sensor devices and communicating with the drive and the one or more wireless sensor devices over the local wireless communications network. The communication circuitry 421 is configured to carry out functionalities described above by means of any of blocks 201 to 203, 206 of FIG. 2 and blocks/messages 302 to 304, 306 to 308, 316, 318, 322 of FIG. 3 using one or more individual circuitries. The one or more control circuitry 420 further comprise information processing circuitry 422 for processing user inputs and received measurement data. The information processing circuitry 422 is configured to carry out functionalities described above by means of any of blocks 204, 205 of FIG. 2 and blocks/messages 301, 305, 319, 320, 321 of FIG. 3 using one or more individual circuitries.

Referring to FIG. 4, the memory 430 may be implemented using any suitable data storage technology, such as semiconductor based memory devices, flash memory, magnetic memory devices and systems, optical memory devices and systems, fixed memory and removable memory.

Referring to FIG. 4, the wireless computing device 401 may further comprise different interfaces 410 such as one or more communication interfaces (TX/RX) comprising hardware and/or software for realizing communication connectivity according to one or more communication protocols (comprising, e.g., Bluetooth Low Energy or other low-power communication protocol). Specifically, the one or more communication interfaces 410 may comprise, for example, interfaces providing a connection to one or more drives and one or more wireless sensor devices. The one or more communication interface 410 may provide the wireless computing device with communication capabilities to communicate in a cellular communication system and enable communication between user devices (terminal devices) and different network nodes or elements and/or a communication interface to enable communication between different network nodes or elements, for example. The one or more communication interfaces 410 may comprise standard well-known components such as an amplifier, filter, frequency-converter, (de)modulator, and encoder/decoder circuitries, controlled by the corresponding controlling units, and one or more antennas.

Figure 5:
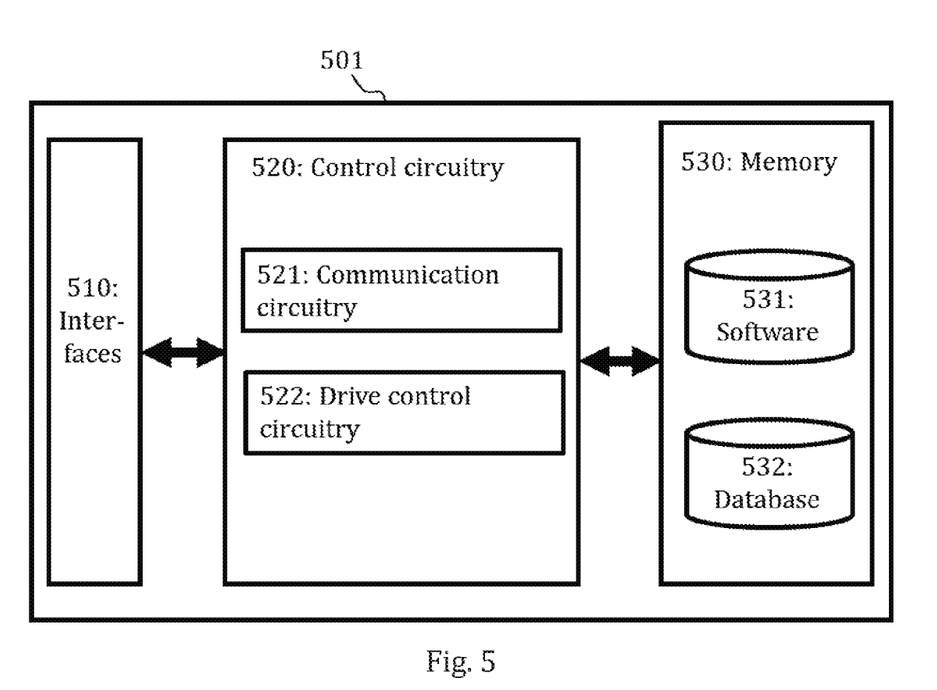
FIG. 5 illustrates an exemplary drive according to embodiments.

FIG. 5 provides a drive 501 according to some embodiments. Specifically, FIG. 5 may illustrate a drive configured to carry out at least the functions described above in connection with communicating with a wireless computing device and driving an industrial process. The drive 501 may be a drive 101 of FIG. 1. The drive 501 may comprise one or more control circuitry 520, such as at least one processor, and at least one memory 530, including one or more algorithms 531, such as a computer program code (software) wherein the at least one memory and the computer program code (software) are configured, with the at least one processor, to cause the drive to carry out any one of the exemplified functionalities of the drive described above. Said at least one memory 530 may also comprise at least one database 532.

Referring to FIG. 5, the one or more control circuitry 520 of the drive 501 comprise at least communication circuitry 521 for establishing a local wireless communications network with a wireless computing device (and one or more wireless sensor devices) and communicating with the wireless computing device over the local wireless communications network. The communication circuitry 521 is configured to carry out functionalities described above by means of any of messages 302, 324 of FIG. 3 using one or more individual circuitries. The one or more control circuitry 520 further comprise drive control circuitry 522 for controlling the drive. The drive control circuitry 522 is configured to carry out functionalities described above by means of any of blocks 309, 314 of FIG. 3 using one or more individual circuitries.

Referring to FIG. 5, the memory 530 may be implemented using any suitable data storage technology, such as semiconductor based memory devices, flash memory, magnetic memory devices and systems, optical memory devices and systems, fixed memory and removable memory.

Referring to FIG. 5, the wireless computing device 501 may further comprise different interfaces 510 such as one or more communication interfaces (TX/RX) comprising hardware and/or software for realizing communication connectivity according to one or more communication protocols (comprising, e.g., Bluetooth Low Energy or other low-power communication protocol). Specifically, the one or more communication interfaces 510 may comprise, for example, interfaces providing a connection to a wireless computing device. The one or more communication interfaces 510 may comprise standard well-known components such as an amplifier, filter, frequency-converter, (de)modulator, and encoder/decoder circuitries, controlled by the corresponding controlling units, and one or more antennas.

Figure 6:
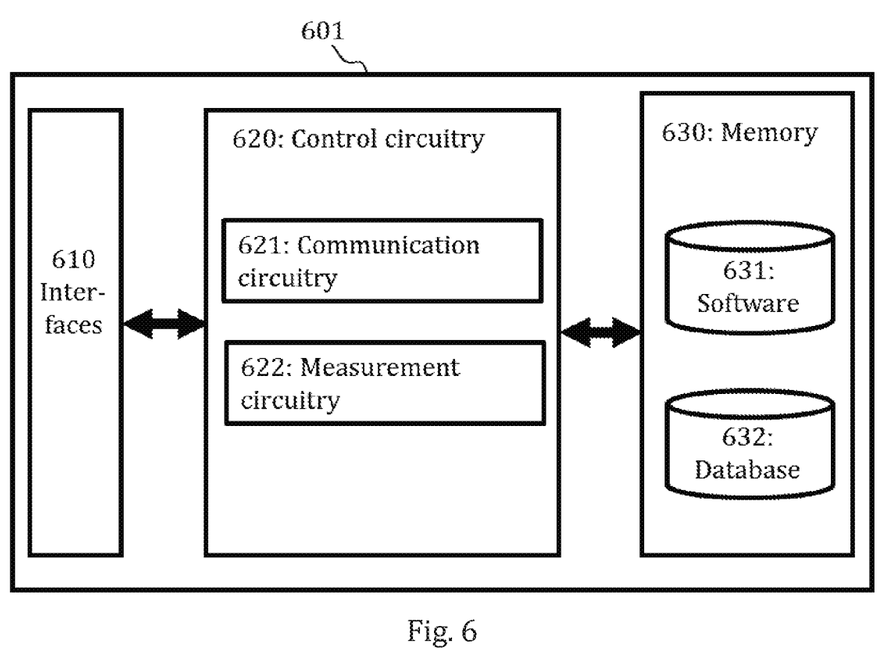
FIG. 6 illustrates an exemplary wireless sensor device according to embodiments.

FIG. 6 provides a wireless sensor device 601 according to some embodiments. Specifically, FIG. 6 may illustrate a wireless sensor device configured to carry out at least the functions described above in connection with communicating with a wireless computing device and performing measurements. The wireless sensor device 601 may be any of the wireless sensor devices 104 to 107 of FIG. 1. The wireless sensor device 601 may comprise one or more control circuitry 620, such as at least one processor, and at least one memory 630, including one or more algorithms 631, such as a computer program code (software) wherein the at least one memory and the computer program code (software) are configured, with the at least one processor, to cause the wireless sensor device to carry out any one of the exemplified functionalities of the wireless sensor device described above. Said at least one memory 630 may also comprise at least one database 632.

Referring to FIG. 6, the one or more control circuitry 620 of the wireless sensor device 601 comprise at least communication circuitry 621 for establishing a local wireless communications network with a wireless computing device (and a drive) and communicating with the wireless computing device over the local wireless communications network. The communication circuitry 621 is configured to carry out functionalities described above by means of any of messages 303, 304, 315, 317 of FIG. 3 using one or more individual circuitries. The one or more control circuitry 620 further comprise measurement circuitry 622 for performing measurements using one or more sensors. The measurement circuitry 622 is configured to carry out functionalities described above by means of any of blocks 310, 311, 312, 313 of FIG. 3 using one or more individual circuitries.

Referring to FIG. 6, the memory 630 may be implemented using any suitable data storage technology, such as semiconductor based memory devices, flash memory, magnetic memory devices and systems, optical memory devices and systems, fixed memory and removable memory.

Referring to FIG. 6, the wireless sensor device 601 may further comprise different interfaces 610 such as one or more communication interfaces (TX/RX) comprising hardware and/or software for realizing communication connectivity according to one or more communication protocols. Said one or more communication protocols may consist solely of a single low-power communication protocol such as Bluetooth Low Energy. The one or more communication interfaces 610 may comprise, for example, interfaces providing a connection to a wireless computing device. The one or more communication interfaces 610 may comprise standard well-known components such as an amplifier, filter, frequency-converter, (de)modulator, and encoder/decoder circuitries, controlled by the corresponding controlling units, and one or more antennas. The interfaces 610 may comprise one or more sensors (of any type described in relation to FIG. 1).

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 and 3 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 and 3 or operations thereof.

Further regarding the means for performing the processes, the techniques and methods described herein may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 and 3 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
    establishing, by a wireless computing device, a local wireless communications network comprising one or more wireless sensor devices, a drive and the wireless computing device by communicating wirelessly with each of the one or more wireless sensor devices and the drive, wherein the one or more wireless sensor devices are configured to measure one or more physical quantities each of which quantifies an aspect of an industrial system which is controlled by the drive, wherein the industrial system comprises at least the drive, at least one electrical machine controlled by the drive and at least one mechanical system powered by the at least one electrical machine;
    transmitting, by the wireless computing device, a drive control sequence for the drive to the drive over the local wireless communications network so as to configure the drive, wherein the drive control sequence is a pre-defined drive control sequence or is defined based on user input provided by a user of the wireless computing device via the user interface of the wireless computing device;
    transmitting, by the wireless computing device, a sensor measurement sequence for each of said one or more wireless sensor devices to each of said one or more wireless sensor devices over the local wireless communications network so as to configure said one or more wireless sensor devices to perform sensor measurements, wherein each sensor measurement sequence transmitted to said one or more wireless sensor devices is a pre-defined sensor measurement sequence or is defined based on user input provided by the user via the user interface, each sensor measurement sequence being synchronized at least in part with the drive control sequence;
    receiving, in the wireless computing device, information on one or more measured values of the one or more physical quantities from the one or more wireless sensor devices via the local wireless communications network;
    displaying, by the wireless computing device, the information on the one or more measured values of the one or more physical quantities on a display of the wireless computing device for providing guidance for the user for adjusting drive parameters of the drive; and
    in response to receiving a user input for changing one or more drive parameters of the drive via the user interface, transmitting, by the wireless computing device, a command to change the one or more drive parameters to the drive via the local wireless communications network.

2. The method according to claim 1, further comprising:
    repeating, by the wireless computing device, the steps of the configuring, the receiving of the information, the displaying and the transmitting of the command responsive to the user input in response to the transmitting of the command or in response to receiving an acknowledgment acknowledging the changing of the one or more drive parameters from the drive via the local wireless communications network.

3. The method according to claim 1, wherein the one or more wireless sensor devices consist of a plurality of wireless sensor devices configured to measure two or more physical quantities quantifying different aspects of the industrial system which is controlled by the drive.

4. The method according to claim 1, wherein the receiving of the information on the one or more measured values of the one or more physical quantities comprises:
    receiving, from each of the one or more wireless sensor devices, information on a plurality of values of at least one physical quantity measured successively according to a sensor measurement sequence configured to said wireless sensor device.

5. The method according to claim 1, wherein the establishing of the local wireless communications network and any subsequent communication within the local wireless communications network uses Bluetooth Low Energy.

6. The method according to claim 1, wherein the drive control sequence for the drive defines at least a starting time for operation of the drive and an ending time for the operation of the drive and/or each sensor measurement sequence defines at least a starting time for performing measurements by a wireless sensor device and an ending time for performing measurements by the wireless sensor device.

7. The method according to claim 1, wherein the drive control sequence for the drive defines at least a starting time for operation of the drive, an ending time for the operation of the drive and one or more drive parameters of the drive to be employed during the operation of the drive and/or each sensor measurement sequence defines at least a starting time for performing measurements by a wireless sensor device, an ending time for performing measurements by the wireless sensor device and one or more measurement parameters comprising at least a sampling rate or a time resolution for measurements by the wireless sensor device.

8. A non-transitory computer readable media having stored thereon instructions that, when executed by a computing device, cause the computing device to perform a method according to claim 1.

9. A wireless computing device comprising:
   at least one processor; and
   at least one memory including computer program code, wherein the at least one memory comprises a non-transitory storage medium,
   the at least one memory and the computer program code being configured, with the at least one processor, to cause the wireless computing device at least to perform a method according to claim 1.

10. A wireless computing device according to claim 9, wherein the wireless computing device is a mobile phone or a tablet computer.

11. A system comprising:
   a wireless computing device according to claim 9;
   a drive comprising at least one processor; and at least one memory including computer program code, the at least one memory and the computer program code being configured, with the at least one processor, to cause the drive at least to control an industrial system and communicate wirelessly with the wireless computing device; and
   one or more wireless sensor devices installed to the industrial system, wherein each of the one or more wireless sensor devices comprises one or more sensors and at least one processor; and at least one memory including computer program code, the at least one memory and the computer program code being configured, with the at least one processor, to cause a wireless sensor device at least to measure, using the one or more sensors, one or more physical quantities each of which quantifies an aspect of the industrial system which is controlled by the drive and to communicate wirelessly with the wireless computing device.

12. The system according to claim 11, wherein each of the one or more wireless sensor devices is a dedicated low-power wireless sensor device or a dedicated low-power wireless microsensor device.

13. The system according to claim 11, wherein the at least one memory and the computer program code of the drive are further configured, with the at least one processor of the drive, to cause the drive to perform:
   in response to receiving a drive control sequence from the wireless computing device, operating the drive according to the drive control sequence; and
   in response to receiving a command to change one or more device parameters of the drive from the wireless computing device, changing the one or more device parameters of the drive.

14. The system according to claim 11, wherein, for each of the one or more wireless sensor device, the at least one memory and the computer program code of a wireless sensor device are further configured, with the at least one processor of the wireless sensor device and the one or more sensors, to cause the wireless sensor device to perform:
   in response to receiving a sensor measurement sequence from the wireless computing device, performing one or more measurements of the one or more corresponding physical quantities according to the sensor measurement sequence and transmitting one or more measured values to the wireless computing device.

15. The system according to claim 11, wherein the one or more sensors comprise one or more of a speed sensor, an acceleration sensor, a vibration sensor, a position sensor, an angular position sensor, a displacement sensor, an angular velocity sensor, an angular acceleration sensor, a torque sensor, an acoustic sensor, a humidity sensor, a temperature sensor, a light sensor, an air flow sensor and a pH sensor.

* * * * *